3,642,737
PROCESS FOR THE POLYMERIZATION OF
VINYL CHLORIDE
Luigi Patron and Alberto Moretti, Venice, and Renato Pasqualetto, Porto Marghera, Italy, assignors to Chatillon Società Anonima Italiana per le Fibre Tessili Artificiali S.p.A., Milan, Italy
No Drawing. Filed June 24, 1969, Ser. No.836,166
Claims priority, application Italy, June 28, 1968, 18,362/68
Int. Cl. C08f 1/62, 3/30
U.S. Cl. 260—85.5          19 Claims

ABSTRACT OF THE DISCLOSURE

A process is disclosed for obtaining highly syndiotactic, white and heat-stable polyvinyl chloride (particularly suited for conversion into fibers) by bulk polymerization at low temperature of vinyl chloride, the polymerization being conducted in the presence of a catalytic system consisting essentially of an organic hydroperoxide, such as cumene hydroperoxide or t-butylhydroperoxide, activated by an alcoholic solution of sulphur dioxide and of at least one oxide or hydroxide of an alkali metal or of magnesium or of magnesium sulphite, and in which the ratio: $SO_2/Me$ is lower than 1.5 where $SO_2$ is the concentration in gram-moles/liter of the total sulphur dioxide and Me is the concentration of the metal in gram-equivalent/liter. The polymerization may be short-stopped at the desired level by treating the polymerization mixture with an aqueous solution of a hydroxylamine salt such as the hydrochloride or sulphate. At least one other ethylenically unsaturated monomer copolymerizable with vinyl chloride may also be present, thereby resulting in a copolymer.

The present invention relates to a process for the low-temperature bulk polymerization of vinyl chloride.

It is known that the physical properties of the polyvinyl chloride depend on the polymerization temperature, in the sense that these steadily improve with the gradual lowering of the polymerization temperature.

As a matter of fact, it has been noticed that on conducting the polymerization of the vinyl chloride at temperatures below 0° C., polymers are obtained which show particular physical characteristics, such as an increased percentage of crystallinity combined with a high index of syndiotacticity, a higher glass-transition temperature, a higher softening temperature, etc., then those of polyvinyl chloride obtained at a higher polymerization temperature.

The carrying out of the low temperature polymerization of vinyl chloride, in practice, involves serious difficulties both with regard to the polymerization process as well as to the catalyst to be used.

In fact, the only polymerization process that can be easily carried out at a low temperature is the bulk polymerization process because the other known polymerization processes, that is, the emulsion- and the solution-polymerizations, practically cannot be carried out owing to the difficulty of obtaining at low temperature an emulsion or a solution. Furthermore, those polymerization systems involve the use of very voluminous reactors and great volumes of reacting compounds in order to obtain industrially interesting productivity, high costs for bringing the polymerization mixture down to a low temperature, etc.

With regard to the catalyst, the usual polymerization initiators, such as organic peroxides, azo-bis-isobutyronitrile, persulphates and the Redox catalysts, in which are used persulphates associated with a reducing agent such as $SO_2$, sodium sulphite or hydrazine, etc., are ineffective in the low temperature polymerization of vinyl chloride in as much as at these low temperatures they are stable and do not produce the free radicals required for starting the polymerization.

A catalytic system which has proved to be effective for starting the low temperature bulk polymerization of vinyl chloride is that recently suggested in copending application Ser. No. 671,216, filed Sept. 28, 1967, and which consists of an organic hydroperoxide, sulphur dioxide and an alcoholate of a metal of Groups I and II of the Periodic System or of aluminum.

Previously it was suggested to carry out the low temperature bulk polymerization of vinyl chloride by using, as a catalyst, an organo-metal compound selected from the group consisting of zinc-alkyls, cadmium-alkyls, aluminum-alkyls, boron-alkyls, etc., in combination with oxygen or with an oxidizing compound.

In practice, however, the use of catalysts containing an organo-metal compound turns out to be quite difficult both in consequence of their self-inflammability when in contact with the air, as well as the difficulty of their synthesis, and the difficulties arising from their use because even the slightest traces of oxygen not checked during the polymerization may produce wide variations in the polymerization conversion and in the viscosity of the polymer.

Furthermore, the decomposition products to such catalysts, at room temperature or at temperatures higher than room temperature, prove to be still excellent polymerization initiators, wherefore the recovered unreacted monomers containing the decomposition products of said catalysts tend to polymerize during their recovery and storage. There thus arises the problem of completely eliminating from the unreacted monomers these decomposition products of such catalysts.

It has now been found according to the present invention that it is possible to obtain a highly syndiotactic, white polyvinyl chloride, highly resistant to color heat-degradation, particularly suited for being used for the production of fibers, without the above-mentioned drawbacks, by low-temperature bulk-polymerizing the vinyl chloride in the presence of a catalytic system consisting or essentially consisting of an organic hydroperoxide activated by an alcoholic solution of sulphur dioxide and of at least one oxide or a hydroxide of an alkali metal or of magnesium or of magnesium sulphite, in which the $SO_2/Me$ ratio is below 1.5, but preferably between 0.8 and 1, $SO_2$ being the concentration in gram-moles/lt. of the total sulphur dioxide and Me being the concentration of the metal in gram-equivalents/lt.

The catalytic Redox system consisting of an organic hydroperoxide and sulphur dioxide is already known. It is capable of starting the low temperature copolymerization of the sulphur dioxide with organic compounds having an ethylenic unsaturation, as well as starting the solution polymerization of acrylonitrile. However, tests have proved that such a catalytic Redox system is ineffective in the low temperature bulk polymerization of vinyl chloride.

In fact, it has been proved that when the reaction medium is vinyl chloride, the sulphur dioxide catalyzes the ionic decomposition of the hydroperoxide without formation of free radicals; thus, for instance, cumene hydroperoxide, in vinyl chloride at −30° C., is quantitatively, and nearly immediately, decomposed by the $SO_2$ in acetone and phenol, while the sulphur dioxide remains unchanged. It has also been proved that the addition to the reaction medium, consisting of vinyl chloride at a temperature below 0° C., either of an oxide or hydroxide of one of the above cited metals, or magnesium sulphite, in the absence of alcohol, does not have any influence on the decomposition reaction of the hydroperoxide, which always proceeds via an ionic mechanism without producing radicals capable of starting the desired polymerization.

Now, in an altogether surprising way, it has been found according to the present invention that the oxides or hydroxides of the alkali metals or of magnesium, as well as magnesium sulphite, if they are fed into the reaction medium dissolved in an alcoholic solution containing the appropriate quantity of sulphur dioxide, modify substantially the reaction decomposition of the organic hydroperoxide which, in this case, proceeds via the formation of free radicals capable of starting the low-temperature bulk polymerization of the vinyl chloride.

Furthermore, it has been experimentally ascertained that the $SO_2/Me$ ratio, as defined above, plays an important role in influencing the quality of the polymer.

When the $SO_2/Me$ ratio is greater than 1.5, one obtains polymers with a low original color, easily heat-degradable, very often insoluble in the usual solvents for polyvinyl chloride, and therefore unsuited for conversion into fibers.

Experimentally, it has been found that these polymers contain sulfone groups

which originate from the copolymerization of the sulphur dioxide with the vinyl chloride. The concentration of these sulphonic groups depends on the $SO_2/Me$ ratio and gradually decreases with a decrease in this ratio.

When the $SO_2/Me$ ratio is below 1.5, the sulfone group concentration in the polymer is such as not to alter appreciably the color characteristics and the heat-stability of the resulting polymer, while better polymers, from the point of view of the heat-stability and of the original color, are obtained by operating with an $SO_2/Me$ ratio between 0.8 and 1, inasmuch as it has been found that at such a range of ratios the concentration of the sulfone groups is zero.

The polymerization may be conducted also at $SO_2/Me$ ratios lower than 0.8, but without obtaining any further advantages and only at a price of greater consumption of the oxide or of the hydroxide or of the above specified salt.

The following Table I records the conversion and the percentage of sulfone groups

contained in the polyvinyl chloride, as a function of the $SO_2/Me$ ratio.

The polymerizations of the vinyl chloride were carried out in bulk at −30° C., in a discontinuous way, with a reaction time of 60 minutes, in the presence of 0.2% of cumene hydroperoxide referred to the monomer, with a molar ratio sulphur dioxide/cumene hydroperoxide equal to 2, and with different ratios between the $SO_2$ concentration in gram-moles/lt. and the concentration of magnesium oxide in gram-equivalents/lt.

The percentage of the sulfone groups

is determined from the ratio between the absorption of the 1.130 cm.$^{-1}$ (A. 1130) band on the I.R. trace and the absorption of the 1.425 cm.$^{-1}$ (A. 1425) band, and from the ratio between the absorption of the 1.325 cm.$^{-1}$ (A. 1325) band and that of the 1.425 cm.$^{-1}$ (A. 1425) band.

Bands 1.130 cm.$^{-1}$ and 1.325 cm.$^{-1}$ are the typical I.R. absorption bands of the sulfone group and the 1.425 cm.$^{-1}$ band is that of the absorption of the bonding vibration of the —$CH_2$— group in the polyvinyl chloride; (see Shimanouchi and Tasumi, Bull. Chem. Soc. Japan, 34, 359–365 (1961)).

When the absorption ratio A.1.130/A.1.425 is lower than 0.3 and the absorption ratio A.1.325/A.1425 is lower than 1, it is assumed that sulfone groups are practically absent.

TABLE I

| Ratio, $SO_2/Me$ | Absorption ratios | |
|---|---|---|
| | A.1130/A.1425 | A.1325/A.1425 |
| 2 | 0.51 | 1.28 |
| 1.5 | 0.33 | 1.15 |
| 1 | 0.18 | 0.94 |
| 0.9 | 0.18 | 0.95 |

The I.R. spectra were registered by a Perkin-Elmer I.R. 125 grating spectro-photometer on pressed discs of polymer dispersed in KBr.

The organic hydroperoxide used in this invention is an organic compound of the general formula: R—O—O—H, wherein R may be a linear or branched alkyl radical, a cycloalkyl radical or an arylalkyl radical. Examples of organic compounds having the general formula

R—O—O—H that may be advantageously used in the process according to this invention are: methyl-, ethyl-, n.propyl-, tert.butyl-, n.butyl-, amyl-, hexyl-, octyl-, etc. hydroperoxide, ethyl-benzyl - hydroperoxide, iso - butyl - benzyl-hydroperoxide, phenyl-isopropyl-hydroperoxide, etc. Particularly advantageous results are achieved by using cumene-hydroperoxide or tert.-butyl-hydroperoxide.

It must be expressly pointed out that the organic peroxides of the general formula R—O—O—R, as distinct from the hydroperoxides, are ineffective in the process of this invention.

The concentration of the organic hydroperoxide is not critical and typically may vary between 0.01% and 3% by weight with respect to the monomers fed to the reaction zone. Hydroperoxide concentrations between 0.02% and 1% are, however, preferred.

The organic hydroperoxide may be fed to the reaction mass either as such or in solution in a suitable solvent such as methyl-, ethyl- or propyl-alcohol, hexane, etc.

The sulphur dioxide is used in such quantities as to have the molar ratio sulphur dioxide/organic hydroperoxide between 1:15 and 15:1, but preferably between 0.5:1 and 10:1. In practice, it is preferred that the quantity of sulphur dioxide be not greater than 3% by weight of the monomer, in as much as a quantity exceeding 3% would involve a very high polymerization rate which would give rise to various drawbacks in the bulk-polymerization, especially with regard to the exchange or dissipation of the heat of polymerization.

Any oxide or hydroxide of an alkali metal or of magnesium or magnesium sulphite may be used in the process according to this invention. It has been found, however, that the metal exerts a certain influence on the color and on the heat-stability of the color of the polymer obtained. In fact, from this point of view best results will be obtained by using magnesium oxide or hydroxide or magnesium sulphite.

The concentration of the oxides or hydroxides of an alkali metal or of magnesium, or that of the magnesium sulphite in the reaction mixture, is between 0.01 and 5% by weight with respect to the monomers, but preferably between 0.02 and 1%.

As stated previously, the oxide or the hydroxide or the above-mentioned salt is fed to the reaction medium in alcoholic solution containing the predetermined quantity of sulphur dioxide. An aliphatic alcohol having from 1 to 5 carbon atoms is used as the alcohol. Amongst these, methyl alcohol and ethyl alcohol are preferred.

The nature and quantity of such alcohols have no influence on the course of the polymerization, provided that the alcohol be present in a quantity sufficient to dissolve the $SO_2$ and the oxides or the hydroxides or the metal salt in the indicated proportions. In practice, for economical reasons, it is preferred to use concentrated solutions.

By the term "low temperature" is meant a temperature below 0° C. and preferably a temperature between $-10°$ and $-70°$ C. This temperature of the reaction mixture is controlled by conventional means such as, for instance, by keeping the reactor in a cryostatic bath or by circulating a refrigerating fluid around the reactor walls or in coils arranged inside the reactor.

By "bulk polymerization" is meant not only the polymerization carried out by incorporating the catalytic system in the undiluted monomer, but also in the presence of minor quantities of non-reacting organic compounds, liquid at the polymerization temperature, and which exert a fluidizing action on the polymerization slurry, in order to make this latter more stirrable and to facilitate the heat transfer through the polymerization vessel. As fluidizing agents the following substances may be used: aliphatic hydrocarbons, aryl-hydrocarbons, cycloalkyl-hydrocarbons, halogenated saturated hydrocarbons, etc.

If desired, small quantities of alkyl mercaptans may be introduced into the reaction zone for regulating the molecular weight of the polymer. Furthermore, it has been observed that the alkyl mercaptans, besides acting as chain regulators, also act as fluidizers of the polymerization mixture. Amongst the suitable alkyl mercaptans, those having from 1 to 15 carbon atoms are preferred, and amongst these, those having from 4 to 8 carbon atoms yield the best results.

It is advisable to conduct the polymerization in the absence of oxygen which exerts an inhibiting effect on the polymerization. In general, for the purpose of removing the oxygen from the polymerization reactor there are used suitable inert gases such as for instance nitrogen.

The bulk polymerization, in practice, may be conducted in a continuous or in a semi-continuous as well as in a discontinuous (intermittent) manner.

The polymerization may be short-stopped at any desired polymerization stage, that is, at the desired degree of conversion of the monomers and at the desired molecular weight, by treating the reaction mass with an aqueous or alcoholic solution of a salt of hydroxylamine, preferably hydroxylamine hydrochloride or hydroxylamine sulphate. In the case of a continuous polymerization process, the solution of the hydroxylamine salt may be added either in the overflow pipe at the outlet of the polymerization reactor or into a subsequent tank containing water heated at 50° C., in which at the same time is carried out the short-stopping and the separation, by evaporation, of the unreacted monomer from the polymer.

It is to be understood that the catalytic systems used in the process of this invention may also in like manner be applied with advantage to the preparation of vinyl chloride copolymers containing up to 50% by weight of at least one other ethylenically unsaturated monomer copolymerizable with vinyl chloride. The only difference, with respect to the above described process, is that the starting monomers are a mixture of vinyl chloride and one or more other ethylenically unsaturated monomers copolymerizable with vinyl chloride. It is to be understood that the term "ethylenically unsaturated monomers" has reference to organic compounds containing the C=C group. Examples of such compounds are: vinyl or vinylidene compounds such as vinylidene fluoride or chloride, vinyl fluoride, vinyl esters of carboxylic aliphatic acids containing from 2 to 18 carbon atoms, such as, for instance, the vinyl esters of acetic acid, of propionic acid, etc., monomers of the acrylic type such as acrylic acid, methacrylic acid and their derivatives such as acrylonitrile, acrylates or methacrylates of aliphatic alcohols containing from 1 to 12 carbon atoms, such as for instance methyl and ethyl acrylate and methacrylate, etc.

In order still more clearly to illustrate the present invention, the following specific examples are given:

EXAMPLE 1

Into a 2-liter glass polymerization reactor provided with a stirrer, a cooling system and a thermometer, there were continuously fed in:

vinyl chloride,
an organic hydroperoxide of the type and at a feed rate as reported in the following Table II;
a solution of $SO_2$ in one of the alcohols reported in Table II, wherein an oxide or hydroxide of an alkali metal or of magnesium, or magnesium sulphite was dissolved in the quantity reported in Table II.

The polymerization reactor was maintained at the temperature of $-30°$ C. by means of a thermostatically controlled bath. The polymer suspension thus obtained was then discharged through an overflow pipe into an aqueous solution of hydroxylamine hydrochloride at 50° C. maintained at a pH of 6 by the addition of sodium bicarbonate. Thereupon the polymer was separated by centrifugation and then was washed with methanol and dried at 60° C. in a forced air oven.

On Table II are recorded:
(1) The feed rate of vinyl chloride, in g./hr.
(2) The type and the feed rate of hydroperoxide, in g./hr.
(3) The type and the feed rate of alcohol, in cc./hr.
(4) The feed rate of $SO_2$, in g./hr.
(5) The type and the feed rate of oxide, hydroxide or salt, in g./hr.
(6) The $SO_2$/Me ratio, as previously defined.
(7) The conversion expressed in percent with respect to the monomers.
(8) The intrinsic viscosity ($\eta$) of the obtained polymer, determined in cyclohexanone at 30° C. and expressed in dl./g.
(9) The glass transition temperature (Tg) determined according to that described in the J. Polymer Sci., vol. 56 (1962), pp. 225–231.
(10) Index of syndiotacticity (IS) determined on the basis of the ratio between the I.R. absorption bands D 635 cm.$^{-1}$ and D 693 cm.$^{-1}$, as described by Fordham, Burleigh and Sturn, in J. Polymer Sci., vol. XLI, pp. 73–82 (1959).
(11) The original color of the polymer, as determined by means of the General Electric Integrating Spectrophotometer according to the C.I.E. system of representation and measurement of the color. According to this system the color is expressed in terms of the purity index (PI) and of the brightness (B) referred to the Standard illumination.
(12) Heat-stability or heat-sensitivity expressed by the variation of the purity index ($\Delta PI$) and by the variation of the brightness ($\Delta B$) of the polymer after heating in a forced air oven for one hour at 110° C.

TABLE II

| Vinyl chloride, g./hr. | Organic hydroperoxide | Amt., g./hr. | Alcohol | Amt., cc./hr. | SO₂, in g./hr. | Oxide or hydroxide or salt | Amt., g./hr. | Molar ratio, SO₂/Me | Conversion, in percent | Intrinsic viscosity, in dl./g.⁻¹ | Tg, °C. | S.I. | Original color PI | B | Heat stability ΔPI | ΔB |
|---|---|---|---|---|---|---|---|---|---|---|---|---|---|---|---|---|
| 1,000 | Cumene hydroperoxide | 1.81 | Methylic | 11.8 | 1.53 | MgO | 0.24 | 2.0 | 2.5 | 0.85 | 100.0 | 2.1 | 95.2 | 89.0 | 8.0 | 20.0 |
| 1,000 | do | 1.81 | do | 11.8 | 1.53 | MgO | 0.32 | 1.5 | 5.0 | 0.90 | 101.5 | 2.1 | 98.7 | 93.1 | 5.0 | 17.0 |
| 1,000 | do | 1.81 | do | 11.8 | 1.53 | MgO | 0.48 | 1.0 | 11.0 | 1.10 | 103.0 | 2.2 | 99.5 | 95.2 | 2.0 | 12.0 |
| 1,000 | do | 1.81 | do | 11.8 | 1.53 | MgO | 0.53 | 0.9 | 11.5 | 1.22 | 102.5 | 2.15 | 99.8 | 96.3 | 1.8 | 10.5 |
| 1,000 | Terbutyl hydroperoxide | 1.07 | Ethylic | 15.3 | 1.53 | MgO | 0.48 | 1.0 | 11.0 | 1.28 | 103.2 | 2.18 | 99.6 | 96.1 | 1.7 | 10.7 |
| 1,000 | Cumene hydroperoxide | 1.20 | do | 6.8 | 1.02 | Mg(OH)₂ | 0.47 | 1.0 | 10.9 | 1.27 | 102.5 | 2.15 | 99.7 | 96.2 | 1.9 | 10.9 |
| 1,000 | do | 1.81 | Methylic | 11.3 | 0.77 | MgSO₃ | 1.25 | 1.0 | 11.3 | 1.35 | 102.0 | 2.11 | 99.5 | 95.8 | 2.2 | 11.5 |
| 1,000 | do | 1.81 | do | 11.3 | 0.46 | MgSO₃ | 1.25 | 0.8 | 9.5 | 1.40 | 101.5 | 2.10 | 99.3 | 95.8 | 2.3 | 10.9 |
| 1,000 | do | 1.81 | do | 80.0 | 1.53 | KOH | 1.36 | 1.0 | 10.5 | 1.20 | 101.5 | 2.11 | 98.5 | 92.2 | 4.5 | 12.0 |
| 1,000 | Terbutyl hydroperoxide | 1.07 | do | 80.0 | 1.53 | NaOH | 0.96 | 1.0 | 10.7 | 1.23 | 102.0 | 2.15 | 98.3 | 92.5 | 5.0 | 12.5 |

EXAMPLE 2

Into a 2-liter polymerization reactor containing 2,000 g. of vinyl chloride cooled down to −15° C. and maintained at this temperature by means of a thermostatically controlled bath, were fed, with stirring, over a period of 2 hours:

3 g. of cumene hydroperoxide;
0.95 g. of magnesium oxide dissolved in 25 cc. of a methanolic solution of sulphur dioxide at 12% by volume.

After the feeding has been completed, the reactor was kept at −15° C., with stirring, in a nitrogen atmosphere for one hour. Thereafter the reaction mixture was discharged and the polymer recovered by filtering. The polymer thus obtained was then washed with methanol and then dried in an oven at 50° C., under vacuum, for 12 hours. 260 g. of polymer were obtained (conversion 13%) having the following properties:

Intrinsic viscosity ($\eta$) _____ dl./g__ 1.35
Syndiotacticity index _____ 1.8
Tg _____ °C__ 99
Original color:
  PI _____ 99.8
  B _____ 96.5
Heat-sensitivity:
  ΔPI _____ 1.55
  ΔB _____ 12.0

When the same procedure is repeated at a temperature of −45° C., one obtains a 9.0% conversion and the polymer obtained shows the following properties:

Intrinsic viscosity ($\eta$) _____dl./g__ 1.1
Original color:
  PI _____dl./g__ 99.8
  B _____dl./g__ 96.8
Heat Sensitivity:
  ΔPI _____dl./g__ 1.9
  ΔB _____°C__ 10.7
Tg _____°C__ 107
Syndiotacticity index _____dl./g__ 2.4

EXAMPLE 3

Operating according to the procedure followed above in Example 2, in 2 hours there were fed in 2,000 g. of vinyl chloride, maintained at −20° C:

1 g. of cumene hydroperoxide;
0.84 g. of sulphur dioxide;
0.56 g. of potassium oxide dissolved in 45 cc. of methanolic solution at 1.87% by volume of SO₂.

250 g. of polymer (conversion 12.5%) were obtained having the following characteristics:

Intrinsic viscosity ($\eta$) _____dl./g__ 1.05
Tg _____° C__ 97
Syndiotacticity index _____dl./g__ 1.8
Original color:
  PI _____dl./g__ 98.5
  B _____dl./g__ 92.3
Heat-sensitivity:
  ΔPI _____dl./g__ 6
  ΔB _____dl./g__ 15

EXAMPLE 4

Operating according to the procedure followed in Example 1, into the reactor were continuously fed:

1600 g./hr. of vinyl chloride,
400 g./hr. of ethyl chloride,
48 g./hr. of cumene hydroperoxide, and
134 cc./hr. of a methanolic solution of 15.2% by volume in SO₂ and at 5.0% by volume in magnesium oxide.

The polymerization temperature was −40° C.

The conversion amounted to 10% and the polymer obtained showed the following characteristics:

Intrinsic viscosity ($\eta$) _____dl./g__ 0.8
Syndiotacticity index _____dl./g__ 2.25
Tg _____° C__ −107.0
Original color:
  PI _____dl./g__ 98.5
  B _____dl./g__ 93.0
Heat-sensitivity:
  ΔPI _____dl./g__ 3.0
  ΔB _____dl./g__ 13.0

EXAMPLE 5

Operating according to the procedure followed in Example 4, the following compounds were continuously fed into the polymerization reactor:

250 g./hr. of vinyl chloride,
0.0250 g./hr. of cumene hydroperoxide,
2 cc./hr. of an ethanolic acid solution containing 0.055 g. of SO₂ and 0.018 g. of magnesium oxide.

The polymerization temperature was −20° C.

The conversion amounted to 5.0% and the polymer obtained showed the following characteristics:

Intrinsic viscosity ($\eta$) _____dl./g__ 1.40
Syndiotacticity index _____dl./g__ 1.85
Tg _____° C__ 100
Original color:
  PI _____dl./g__ 99.8
  B _____dl./g__ 96.8
Heat sensitivity:
  ΔPI _____dl./g__ 2.5
  ΔB _____dl./g__ 9.0

EXAMPLE 6

Operating according to Example 1, into a 2 liter reactor maintained at −30° C. by means of a thermostatically controlled bath, the following substances were fed in:

250 g./hr. of vinyl chloride,
0.395 g./hr. of ter-butyl-hydroperoxide,
5.0 cc./hr. of a methanolic solution containing 0.425 g. of $SO_2$ and 0.147 g. of magnesium oxide,
0.025 g./hr. of n.butyl-mercaptan.

The polymerization conversion amounted to 12.8% and the polymer obtained showed the following characteristics:

| | | |
|---|---|---|
| Intrinsic viscosity ($\eta$) | dl./g. | 1.01 |
| Tg | ° C. | 101.5 |
| Originol color: | | |
| PI | dl./g. | 99.8 |
| B | dl./g. | 97.6 |
| Heat sensitivity: | | |
| $\Delta$PI | dl./g. | 1.3 |
| B$\Delta$ | dl./g. | 10.5 |
| Syndiotacticity index | dl./g. | 2.15 |

What is claimed is:

1. In a process for obtaining highly syndiotactic, white and heat-stable polyvinyl chloride, particularly suited for conversion into fibers, by the bulk polymerization of vinyl chloride at a temperature below 0° C. and down to about −70° C., the improvement wherein said polymerization is conducted in the presence of a catalytic system consisting essentially of (a) an organic hydroperoxide, said organic hydroperoxide being present in a concentration between 0.01 and 3% by weight with respect to the monomer, activated by (b) an alcoholic solution of sulphur dioxide and at least one oxide or hydroxide of an alkali metal or magnesium or of magnesium sulphite, in which the molar ratio $SO_2$/organic hydroperoxide is between 1:15 and 15:1 and the ratio $SO_2$/Me is lower than 1.5, $SO_2$ being the concentration in gram-moles/liter of the total sulphur dioxide and Me being the concentration of the metal in gram-equivalents/liter.

2. A process according to claim 1, wherein the said ratio $SO_2$/Me is between 0.8 and 1.

3. A process according to claim 1, wherein the alcoholic solution contains sulphur dioxide and magnesium oxide.

4. A process according to claim 1, wherein the alcoholic solution contains sulphur dioxide and magnesium hydroxide.

5. A process according to claim 1, wherein the alcoholic solution contains sulphur dioxide and magnesium sulphite.

6. A process according to claim 1, wherein the preparation of the alcoholic solution an aliphatic alcohol having from 1 to 5 carbon atoms is used.

7. A process according to claim 6, wherein the alcohol is methyl alcohol or ethyl alcohol.

8. A process according to claim 1, wherein the quantity of oxide or hydroxide of an alkali metal or magnesium or magnesium sulphite is between 0.01% and 5% by weight with respect to the monomers.

9. A process according to claim 8, wherein the quantity of oxide or hydroxide of an alkali metal or magnesium or magnesium sulphite is between 0.02% and 1% by weight with respect to the monomers.

10. A process according to claim 1, wherein the concentration of the organic hydroperoxide varies between 0.02% and 1% with respect to the monomers.

11. A process according to claim 1, wherein as organic hydroperoxide cumene hydroperoxide or tert.-butyl-hydroperoxide is used.

12. A process according to claim 1, wherein the molar ratio $SO_2$/organic hydroperoxide is between 0.5:1 and 10:1.

13. A process according to claim 1, wherein the quantity of $SO_2$ does not exceed 3% by weight with respect to the monomers.

14. A process according to claim 12, wherein the quantity of $SO_2$ does not exceed 3% by weight with respect to the monomers.

15. A process according to claim 1. wherein the polymerization is conducted in the presence of an alkyl mercaptan having from 1 to 15 carbon atoms.

16. A process according to claim 1, wherein the polymerization is conducted in the presence of an alkyl mercaptan having from 4 to 8 carbon atoms.

17. A process according to claim 1, wherein the polymerization is short-stopped at the desired level by treating the polymerization mixture with an aqueous solution of a salt of hydroxylamine.

18. A process according to claim 17, wherein the salt of hydroxylamine is hydroxylamine hydrochloride or hydroxylamine sulphate.

19. A process according to claim 1, wherein the vinyl chloride is copolymerized with up to 50% of at least one other ethylenically unsaturated monomer copolymerizable with vinyl chloride.

References Cited

UNITED STATES PATENTS

| | | | |
|---|---|---|---|
| 3,255,164 | 6/1966 | Visger et al. | 260—86.3 |
| 3,415,797 | 12/1968 | Borsini et al. | 260—92.8 |
| 3,476,727 | 11/1969 | Lo Monaco et al. | 260—92.8 |

JOSEPH L. SCHOFER, Primary Examiner

J. A. DONAHUE, Jr., Assistant Examiner

U.S. Cl. X.R.

260—86.3, 87.1, 87.5 A, 87.7, 92.8